US012773847B2

(12) United States Patent
Ishii et al.

(10) Patent No.: US 12,773,847 B2
(45) Date of Patent: Oct. 27, 2026

(54) PRINTING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Ken Ishii, Kanagawa (JP); Naoki Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/545,089

(22) Filed: Dec. 19, 2023

(65) Prior Publication Data

US 2024/0198660 A1 Jun. 20, 2024

(30) Foreign Application Priority Data

Dec. 20, 2022 (JP) ................................. 2022-203522
Dec. 20, 2022 (JP) ................................. 2022-203523

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC ............................ B41J 2/0452; B41J 2/04586
See application file for complete search history.

(56) References Cited

U.S. PATENT DOCUMENTS

| | | | |
|---|---|---|---|
| 6,659,584 | B2 | 12/2003 | Miura et al. |
| 7,108,347 | B2 | 9/2006 | Miyashita |
| 11,745,503 | B2 | 9/2023 | Yasuda |
| 11,752,771 | B2 | 9/2023 | Kiyokawa |

(Continued)

FOREIGN PATENT DOCUMENTS

| | | | |
|---|---|---|---|
| JP | 11-179884 | A | 7/1999 |
| JP | 2000-280461 | A | 10/2000 |

(Continued)

OTHER PUBLICATIONS

Extended European Search Report dated Apr. 25, 2024, in European Patent Application No. 23217468.0.

(Continued)

*Primary Examiner* — Jason S Uhlenhake
(74) *Attorney, Agent, or Firm* — Venable LLP

(57) ABSTRACT

A printing apparatus includes a carriage on which a printhead is mounted, and the printhead is configured to discharge droplets onto a printing medium from a nozzle of the printhead while moving the carriage relative to the printing medium. The printing apparatus performs detecting droplets discharged from the nozzle; controlling discharge of droplets from the nozzle; and determining a discharging state of the nozzle based on a result of detection, wherein droplets are discharged from the nozzle while the carriage is moving, and wherein the control unit determines the discharging state of the nozzle based on comparison of a threshold stored in a storage unit and information related to a discharging state corresponding to that of some of the droplets discharged from the nozzle while the carriage is moving, the information being derived from a result of detection of the droplets.

22 Claims, 10 Drawing Sheets

(56) References Cited

U.S. PATENT DOCUMENTS

| | | | | |
|---|---|---|---|---|
| 2003/0142161 | A1* | 7/2003 | Miura | B41J 2/2142 347/19 |
| 2017/0066235 | A1* | 3/2017 | Fricke | B41J 2/14201 |
| 2018/0281421 | A1* | 10/2018 | Elgee | B41J 2/125 |
| 2022/0016889 | A1* | 1/2022 | Kiyokawa | B41J 29/13 |
| 2023/0391072 | A1 | 12/2023 | Yasuda et al. | |

FOREIGN PATENT DOCUMENTS

| | | | |
|---|---|---|---|
| JP | 2004-066782 | A | 3/2004 |
| JP | 2004-160889 | A | 6/2004 |
| JP | 2007-015194 | A | 1/2007 |
| JP | 2007-152853 | A | 6/2007 |
| JP | 2009-137127 | A | 6/2009 |
| JP | 2010-214812 | A | 9/2010 |
| JP | 2011-093155 | A | 5/2011 |
| JP | 2021-194873 | A | 12/2021 |
| JP | 2022-019361 | A | 1/2022 |

OTHER PUBLICATIONS

Office Action dated Jun. 27, 2026, in Chinese Patent Application No. 202311745370.3.

Office Action dated Aug. 24, 2026, in Japanese Patent Application No. 2022-203522.

Office Action dated Aug. 24, 2026, in Japanese Patent Application No. 2022-203523.

* cited by examiner

Z
Y
DISTANCE H2
DETECTION TIME T2
DISCHARGE SIGNAL
DETECTION SIGNAL 201
205
402
401
404
403
DISTANCE H1
DETECTION TIME T1
DISCHARGE SIGNAL
DETECTION SIGNAL

PRINTING APPARATUS, CONTROL METHOD, AND NON-TRANSITORY COMPUTER-READABLE STORAGE MEDIUM

BACKGROUND OF THE INVENTION

Field of the Invention

The present invention relates to a printing apparatus that performs printing by discharging droplets from a printhead, a control method, and a non-transitory computer-readable storage medium.

Description of the Related Art

Regarding inkjet printing apparatuses, various kinds of output, such as Computer Aided Design (CAD) line drawings, posters, and art works, are anticipated and thus various usage environments are anticipated, including types of ink. In inkjet printing apparatuses that perform reciprocal printing in which ink is discharged during reciprocal movement (scanning) of a printhead, even if the printhead performs discharge at the same position, a difference may occur in the landing position of discharged ink droplets depending on the movement direction of the printhead. The landing position of discharged ink droplets may also change depending on the state of the printhead and the type of ink. As a result, in some cases, details of an image formed on a printing medium and reproducibility of fine lines suffer and thus the overall image quality deteriorates.

Japanese Patent Laid-Open No. 2007-152853 discloses including a measuring unit for measuring an ink discharge velocity and providing a registration adjustment method for appropriately setting a discharge timing, from a movement velocity of reciprocal printing and the discharge velocity, based on the measurement result.

SUMMARY OF THE INVENTION

Here, in inkjet printing apparatuses, regarding ink droplets discharged from a printhead, a plurality of ink droplets of different sizes may be discharged in different propelled states, such as discharge velocities. In such a case, in the conventional method, the plurality of droplets of different propelled states cannot be detected separately, and thus, there are cases where the accuracy of detection of change in the discharging state of the printhead is low.

The present invention has been made in view of the above-described problems, and an object thereof is to provide a technique that makes it possible to determine a discharging state of ink droplets discharged from a printhead with high accuracy.

A feature of the present invention is to provide a technique of a printing apparatus comprising: a carriage on which a printhead is mounted, wherein the printhead is configured to discharge droplets onto a printing medium from a nozzle of the printhead while moving the carriage relative to the printing medium; a detection unit configured to detect droplets discharged from the nozzle; a discharge control unit configured to control discharge of droplets from the nozzle; and a control unit configured to determine a discharging state of the nozzle based on a result of detection of the detection unit, wherein the discharge control unit causes droplets to be discharged from the nozzle while the carriage is moving, and wherein the control unit determines the discharging state of the nozzle based on comparison of a threshold stored in a storage unit and information related to a discharging state corresponding to that of some of the droplets discharged from the nozzle while the carriage is moving, the information being derived from a result of detection of the droplets.

A feature of the present invention is to provide a technique of a control method executed by a printing apparatus comprising a carriage on which a printhead, which is configured to discharge droplets onto a printing medium from a nozzle of the printhead while moving the carriage relative to the printing medium, is mounted, the method comprising: detecting droplets discharged from the nozzle; controlling discharge of droplets from the nozzle; and determining a discharging state of the nozzle based on a detection result of droplets, wherein in the controlling of discharge, droplets are discharged from the nozzle while the carriage is moving, and wherein the determining of the discharging state of the nozzle includes determining the discharging state of the nozzle based on comparison of a threshold stored in a storage unit and information related to a discharging state corresponding to that of some of the droplets discharged from the nozzle while the carriage is moving, the information being derived from a result of detection of the droplets.

A feature of the present invention is to provide a technique of a non-transitory computer-readable storage medium storing a program that, when processed by a computer, causes the computer to function as to control a printing apparatus comprising a carriage on which a printhead, which is configured to discharge droplets onto a printing medium from a nozzle of the printhead while moving the carriage relative to the printing medium, is mounted; a detection unit configured to detect droplets discharged from the nozzle; a discharge control unit configured to control discharge of droplets from the nozzle; and a control unit configured to determine a discharging state of the nozzle based on a result of detection of the detection unit, wherein the discharge control unit causes droplets to be discharged from the nozzle while the carriage is moving, and wherein the control unit determines the discharging state of the nozzle based on comparison of a threshold stored in a storage unit and information related to a discharging state, corresponding to that of some of the droplets discharged from the nozzle while the carriage is moving, the information being derived from a result of detection of the droplets.

According to the present invention, it is possible to determine a discharging state of ink droplets discharged from a printhead with high accuracy.

Further features of the present invention will become apparent from the following description of exemplary embodiments (with reference to the attached drawings).

DESCRIPTION OF THE EMBODIMENTS

Figure 1:
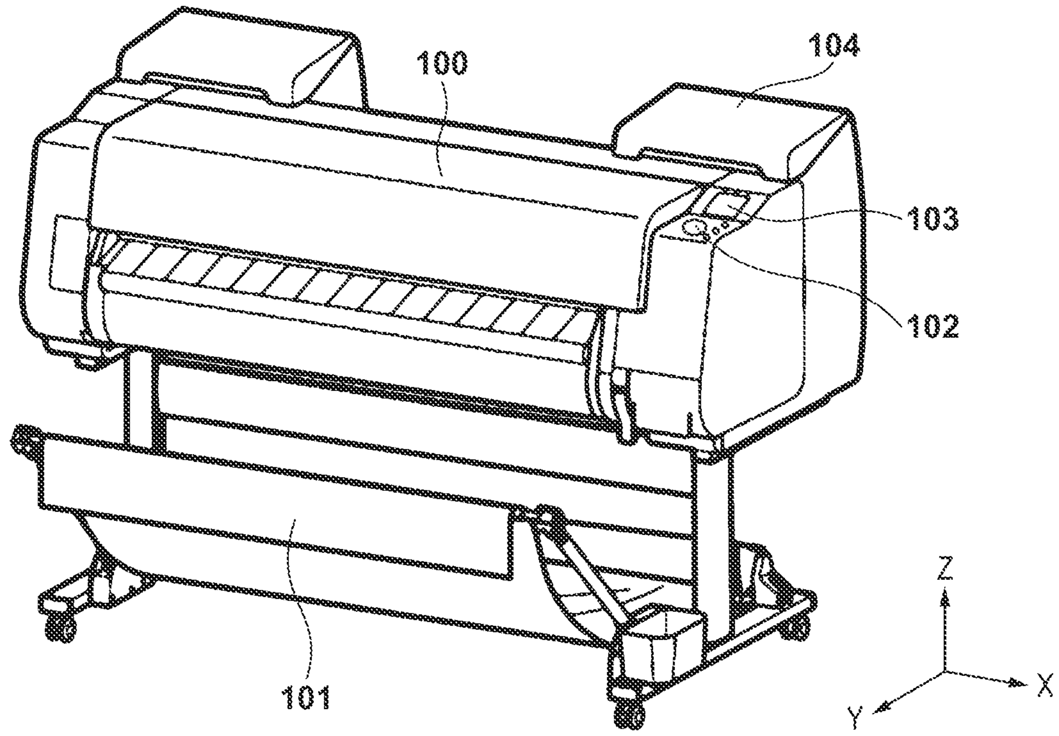
FIG. 1 is a diagram illustrating an appearance of a printing apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the present specification, a term “printing” refers not only to cases where meaningful information, such as text and shapes, is formed, but also meaningless information. In addition, it is assumed that the term “printing” broadly represents cases where images, designs, patterns, and the like are formed on a printing medium, regardless of whether what has been printed manifests itself so as to be visually perceptible by the human eye.

In addition, it is assumed that a term “printing medium” broadly represents not only paper to be used in typical printing apparatuses but also those that can receive ink, such as cloth, plastic films, metal plates, glass, ceramics, wood, and leather. In the following embodiments, description will be given assuming that a printing medium is a printing sheet, but as described above, a printing medium can apply to other types of printing media and is not limited to a printing sheet. In addition, a term “printing apparatus” refers to an apparatus for performing printing on the above-described printing medium.

Furthermore, a term “ink” (sometimes referred to as “liquid”) should be broadly interpreted, similarly to the above-described definition of “printing”. Therefore, it is assumed that the term “ink” represents a liquid that can be used for formation of images, designs, patterns, and the like, processing of a printing medium, or processing of ink (e.g., solidification or insolubilization of a colorant in ink that is to be applied to a printing medium) by being supplied onto a printing medium.

The details of embodiments to which the present invention can be applied will be described below with reference to the drawings.

<General Overview of Printing Apparatus>

FIG. 1 is an external view of an inkjet printing apparatus (hereinafter, printing apparatus) 100, which uses printing sheets that are 10 to 60 inches in size as printing media, according to the present embodiment. The present embodiment is applicable to a printing apparatus in which printing is performed by discharging ink onto any of the above-described printing media and does not limit the type or size of printing media.

The printing apparatus 100 illustrated in FIG. 1 includes a discharge guide 101 on which outputted printing sheets are stacked, an operation panel unit 102 for receiving operations for setting a printing mode, a printing sheet, and the like, and a display panel 103 for displaying various kinds of printing information, setting results, and the like. The printing apparatus 100 further includes an ink tank unit 104, which is for supplying ink to a printhead and houses one or more ink tanks, such as black, cyan, magenta, and yellow ink tanks.

Figure 2:
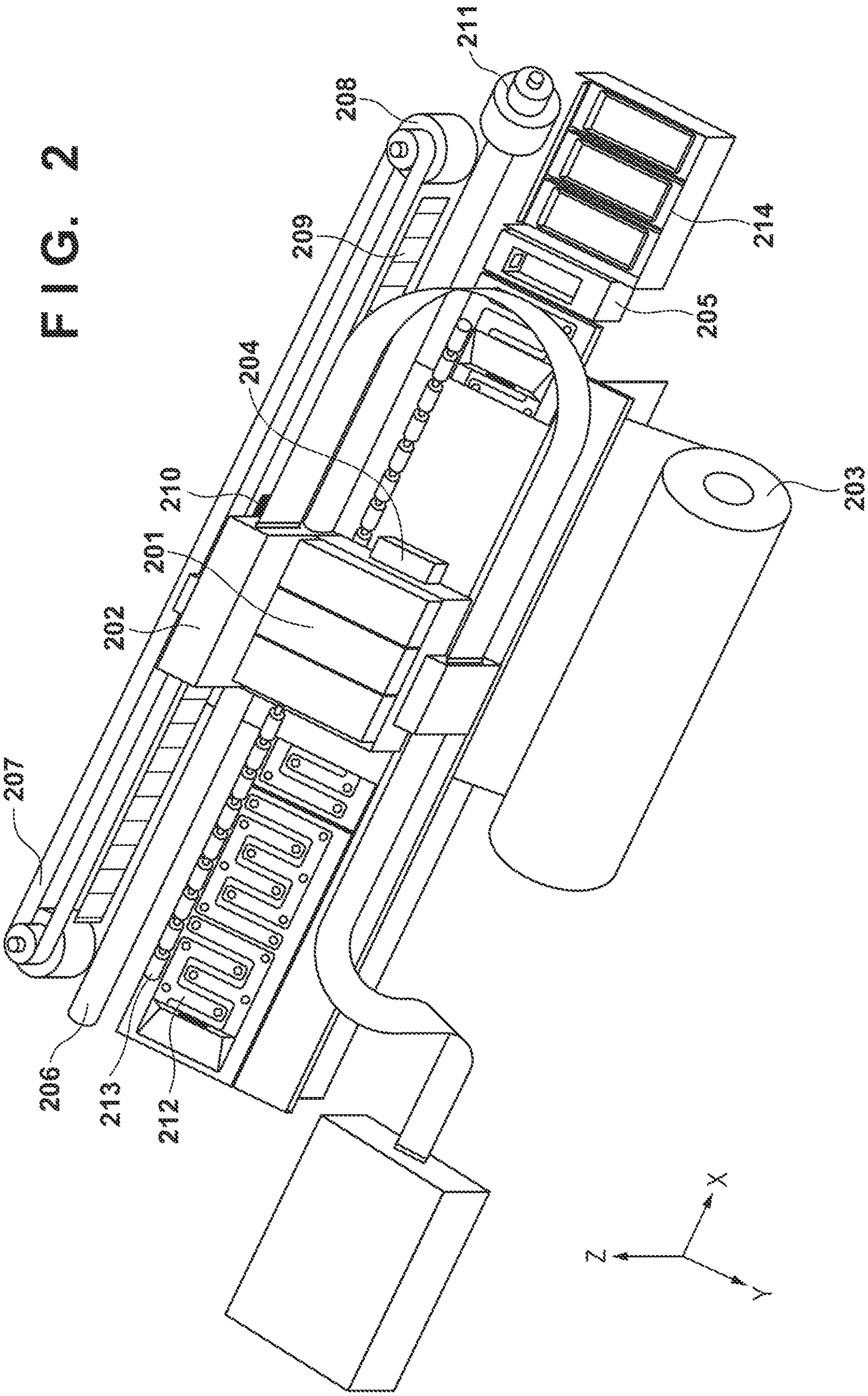
FIG. 2 is a perspective view illustrating an internal configuration of the printing apparatus according to the present embodiment.

FIG. 2 is a perspective view illustrating an example of an internal configuration of the printing apparatus 100. A printhead 201 is mounted on a carriage (hereinafter, also referred to as CR) 202. The printhead 201 includes a sheet detection sensor 204 for detecting a distance between a printing sheet 203 and the printhead 201. The ink tank unit 104, which includes one or more ink tanks is mounted on the CR 202 or the printhead 201. The printing apparatus 100 also includes a droplet detection sensor 205 for detecting ink droplets discharged from the printhead 201. A main rail 206 supports the carriage 202 and, by limiting a movement direction of the carriage 202 to a horizontal direction (direction perpendicular to a conveyance direction of the printing sheet), causes the carriage to perform reciprocal scanning.

The carriage 202 is caused to perform reciprocal scanning in the horizontal direction by being driven by a carriage motor 208 via a carriage conveyance belt 207. The printhead 201 can thereby move relative to the printing sheet. In the present embodiment, a direction in which the printing sheet is conveyed is referred to as a conveyance direction (Y direction in FIG. 2), and a direction in which the carriage reciprocally moves is referred to as a scanning direction (X direction). An encoder sensor 210 mounted on the carriage 202 obtains position information of the carriage 202 by detecting a linear scale 209 arranged in the scanning direction. The printing apparatus 100 also includes a lift motor 211 for changing a height of the carriage 202 in a stepwise manner. The lift motor 211 may move the printhead 201 closer to or further away from the printing sheet 203 by changing the height of the carriage 202. The printing sheet 203 is supported by a platen 212 and conveyed by a sheet conveyance roller 213 in the conveyance direction. The printing sheet 203 here will be described using rolled paper as an example but is not limited thereto, and for example, cut paper may be used. Regarding a width of the printing sheet 203, a configuration may be taken so as to support a plurality of sheet widths. A cap 214 caps the discharge port surface 201*a* (see FIG. 4) of the printhead 201. By capping the discharge port surface 201*a*, moisture evaporation of the ink near the discharge port is suppressed and the state of discharging can be maintained well. The printhead 201 is capped by the cap 214 when printhead 201 is not recording.

Figure 3:
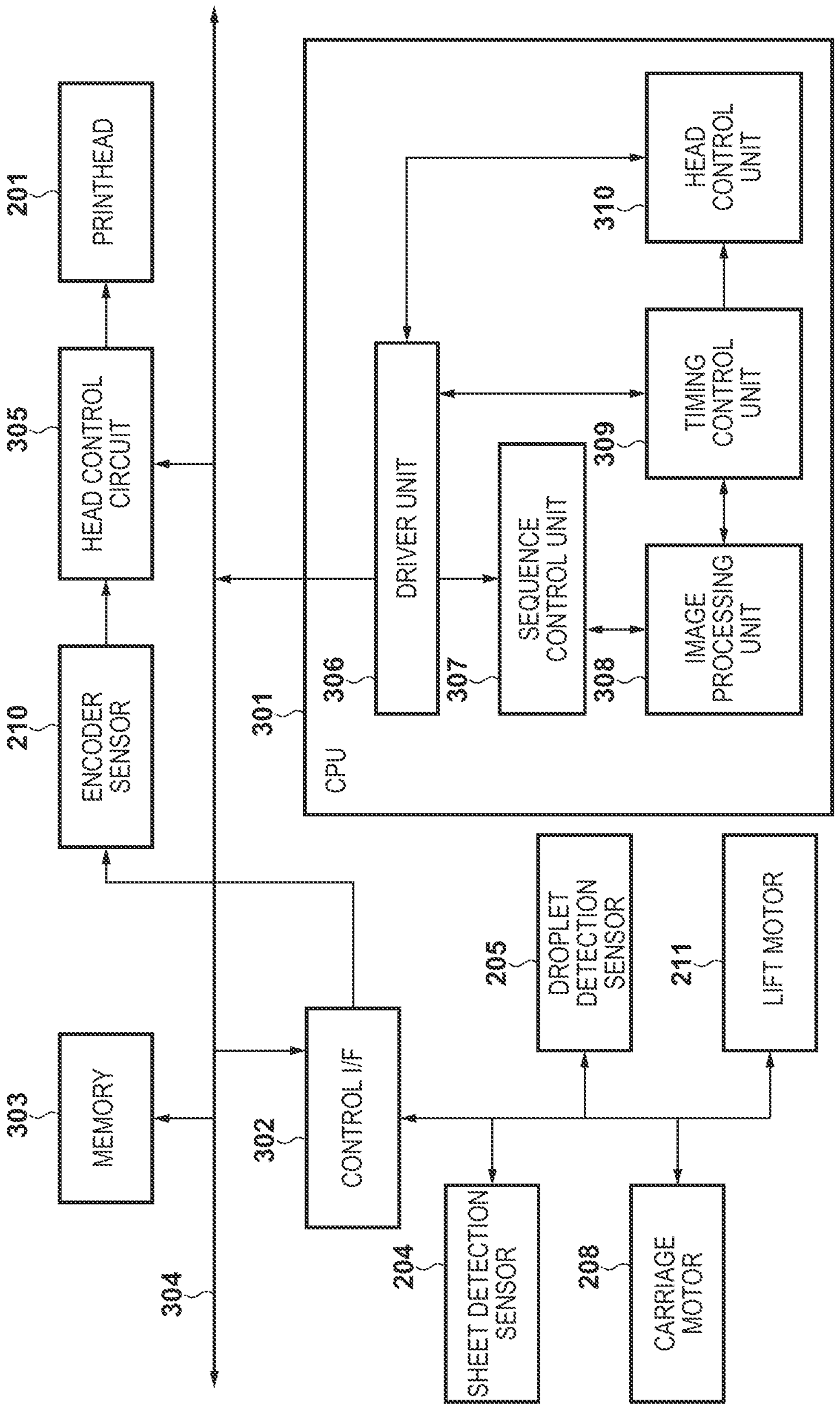
FIG. 3 is a block diagram illustrating a control configuration of the printing apparatus according to the present embodiment.

FIG. 3 is a block diagram illustrating a control configuration of the printing apparatus 100. The printing apparatus 100 includes a Central Processing Unit (CPU) 301, a control interface (I/F) 302, and a memory 303. The CPU 301 executes a process for controlling the entire apparatus by executing a program stored in the memory 303. The control I/F 302 is controlled by the CPU 301 and controls a detection unit, which includes the sheet detection sensor 204, the droplet detection sensor 205, and the encoder sensor 210, and a driving unit, which includes the carriage motor 208 and the lift motor 211. The memory 303 stores various kinds of information, such as a program to be executed by the CPU 301, a discharge velocity to be used by the program, and a thickness of the printing sheet. The CPU 301, the control I/F 302, and the memory 303 are connected by a bus 304 so as to be capable of communication.

The control I/F 302 obtains results detected by the sheet detection sensor 204 and the droplet detection sensor 205. The control I/F 302 also controls the carriage motor 208, which causes the carriage 202 to perform scanning. Furthermore, the control I/F 302 drives a head control circuit 305 based on position information detected by the encoder sensor 210. In the above-described configuration, printing data from a host apparatus (not illustrated) is converted into a head control signal, and printing on the printing sheet 203 is performed by the printhead 201.

The CPU 301 functions as a driver unit 306, a sequence control unit 307, an image processing unit 308, a timing control unit 309, and a head control unit 310 by reading and executing various kinds of programs stored in the memory 303. In the following description, there are cases where the driver unit 306, the sequence control unit 307, the image processing unit 308, the timing control unit 309, and the head control unit 310 are referred to as functional blocks without being distinguished.

The sequence control unit 307 performs overall printing control, specifically, start and stop of each functional block, conveyance control of the printing sheet, scanning control of the carriage 202, and the like.

The driver unit 306 controls the detection unit and the driving unit by outputting respective control signals to the control interface 302, based on commands from the sequence control unit 307, via the bus 304. The driver unit 306 obtains input signals from the detection unit and the driving unit via the control interface 302 and the bus 304 and transmits the input signals to the sequence control unit 307.

The image processing unit 308 performs image processing for color separation and conversion of input image data from the host apparatus. Here, the input image data from the host apparatus is passed to the driver unit 306 via a communication unit (not illustrated) connected to the bus 304 or an input interface, such as universal serial bus (USB), and is transmitted to the image processing unit 308. The timing control unit 309 transmits printing data converted and generated by the image processing unit 308 to the head control unit 310 in coordination with a position of the carriage 202 or the printhead 201. The timing control unit 309 also controls a timing at which the printing data is discharged by the printhead 201 based on the distance between the printhead 201 and the printing sheet 203 detected by the sheet detection sensor 204. Further, the timing control unit 309 controls the timing at which the printing data is discharged by the printhead 201 based on droplet discharge velocity information determined based on a timing at which respective ink droplets are detected by the droplet detection sensor 205. The head control unit 310 converts the printing data inputted from the timing control unit 309 into a head control signal and outputs the head control signal to the printhead 201 as well as controls a temperature of the printhead 201 based on a command of the sequence control unit 307. That is, the head control unit 310 functions as a discharge control unit for controlling discharge of the printhead 201.

Figure 4B:
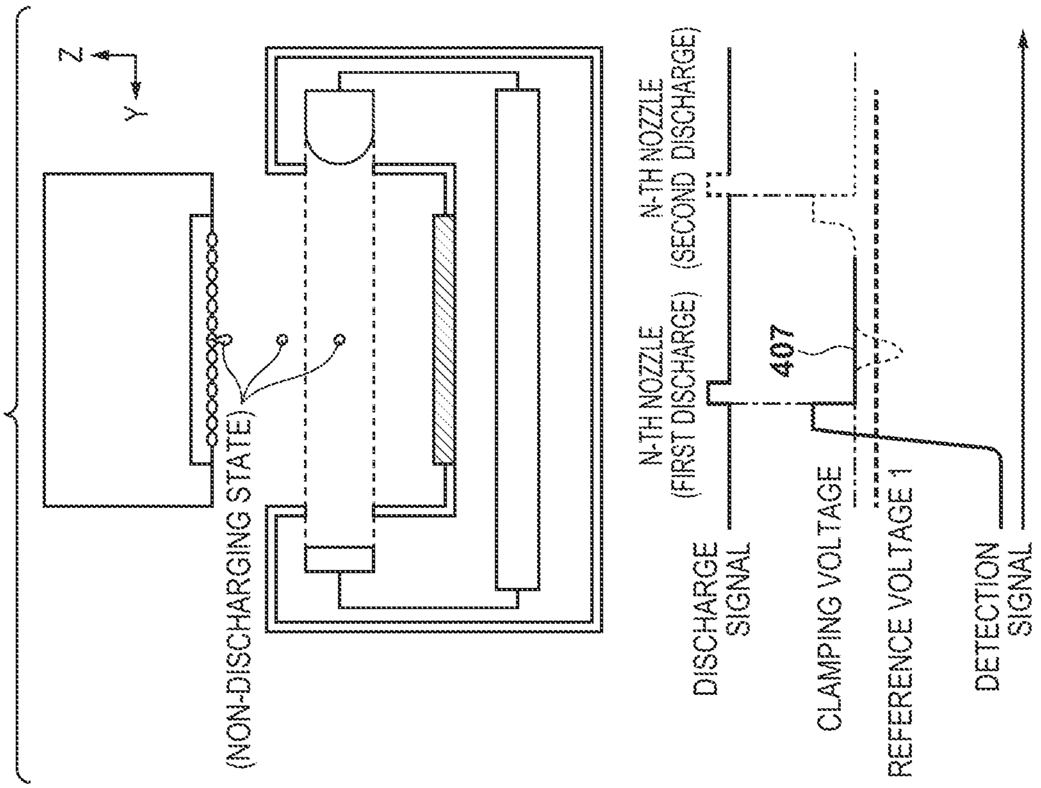
FIG. 4B is a diagram illustrating an example of discharge in a non-discharging state.
Figure 4A:
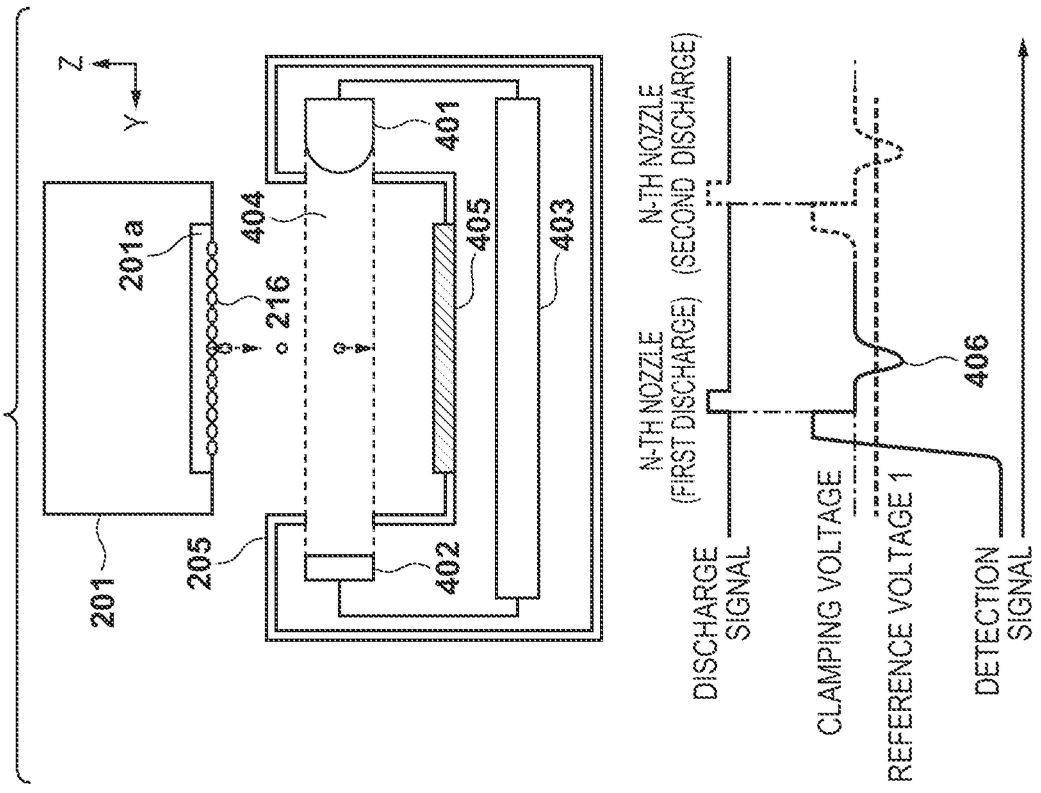
FIG. 4A is a diagram illustrating an example of discharge in a normal discharging state.

Next, a method of detecting a discharging state of ink droplets discharged from the printhead 201 in the present embodiment will be described with reference to FIGS. 4A and 4B. FIG. 4A illustrates an example of discharge in a normal discharging state, and FIG. 4B illustrates an example of discharge in a non-discharging state, that is, a state in which discharge is not performed normally. An upper portion of FIG. 4A and an upper portion of FIG. 4B illustrate cross-sectional views of the printhead 201 and the droplet detection sensor 205 in a YZ plane of the printing apparatus 100. The YZ plane is a plane that passes through the Y direction, which is the conveyance direction of the printing sheet, and a Z direction, which is a vertical direction. As illustrated in the upper portion of FIG. 4A and the upper portion of FIG. 4B, discharge ports (hereinafter, also referred to as nozzles) 216 for discharging, for image formation, ink droplets for a respective ink color are included on a discharge port surface 201*a* of the printhead 201. The droplet detection sensor 205 includes a light emitting element 401, a light receiving element 402, a control circuit board 403, and discharge 405. The light emitting element 401 is disposed such that ink droplets discharged from the nozzle 216 in a discharge direction pass through a light beam 404, and the light receiving element 402 is disposed at a position at which the light beam 404 irradiated from the light emitting element 401 is received. To improve a signal-to-noise (S/N) ratio by narrowing down the light beam 404 irradiated from the light emitting element 401 to the light receiving element 402, an aperture is configured near each element, and an amount of light of the light beam 404 irradiated from the light emitting element 401 to the light receiving element 402 is read by the light receiving element 402.

A lower portion of FIG. 4A and a lower portion of FIG. 4B illustrate timing charts of timings at which a discharge signal (instruction signal), which instructs discharge by applying a driving pulse to the printhead 201, is transmitted and a detection signal of the light receiving element 402, which changes when the droplet detection sensor 205 detects an ink droplet. The droplet detection sensor 205 is configured by the light emitting element 401, the light receiving element 402, the control circuit board 403, and the like. The light emitting element 401 emits the light beam 404, and the light receiving element 402 receives the light beam 404 emitted by the light emitting element 401. In the present embodiment, the light emitting element 401 and the light receiving element 402 are described as being arranged in the Y direction but may be arranged in the X direction. That is, the light emitting element 401 need only emit the light beam 404 in a direction intersecting the discharge direction (Z direction) of the nozzles 216, and the light receiving element 402 need only be disposed at a position capable of receiving the light beam 404 outputted from the light emitting element 401, and they are not limited to the example of FIGS. 4A and 4B. The control circuit board 403 detects an amount of light received by the light receiving element 402 by the light receiving element 402 outputting an output signal corresponding to the amount of received light to the control circuit board 403.

A current-voltage conversion circuit for converting flowing current according to the amount of light received by the light receiving element 402 into a voltage signal and outputting the voltage signal and a circuit for amplifying a level of an ink droplet detection signal are provided on the control circuit board 403. Furthermore, the control circuit board 403 includes a clamping circuit for maintaining a level of a signal outputted from the amplification circuit at a predetermined value (clamping voltage) until discharge detection. This makes it possible to avoid saturation of output and a decrease in the S/N ratio, which are caused by the level of the detection signal of the light receiving element 402 fluctuating due to external disturbances. These circuits ensure the level of the detection signal, which is for detecting minute changes, such as discharge of ink droplets, and depends on desired discharge. That is, the control circuit board 403 includes circuit elements for detecting an output signal of the light receiving element 402, which changes depending on discharge of ink droplets. As a result, when an ink droplet passes through the light beam 404 of the droplet detection sensor 205, the amount of light received by the light receiving element 402 changes, and a discharging state of a detection target nozzle is determined according to a result of comparison between the level of the outputted detection signal and a predetermined reference voltage.

Further, the droplet detection sensor 205 is installed so that an optical axis of the light beam 404 is at the same Z-direction position as that of a surface of the platen 212 that is on a side on which the printing sheet 203 is supported. A slit is provided near each of the light emitting element 401 and the light receiving element 402 to improve the S/N ratio by narrowing down the incident light beam 404. An X-direction position of the printhead 201 at which ink droplets can be discharged such that the ink droplets pass through the light beam 404 is defined as a detection position. When detecting ink droplets in order to determine the discharging state of ink droplets, the carriage motor 208 is controlled by the sequence control unit 307 via the control I/F 302, and the printhead 201 moves to the detection position. The detection position is a position at which the printhead 201 is positioned vertically above the droplet detection sensor 205.

In the present embodiment, as illustrated in FIG. 2, the detection position is disposed outside a region in which the printing sheet is conveyed, in the movement direction (X direction) of the carriage 202. However, the detection position may be provided in the region in which the printing sheet is conveyed. In such a case, the printing apparatus 100 can determine the discharging state of ink droplets in a similar manner as in the present embodiment by performing processes for cutting, conveyance, discharge, and the like of the printing sheet and then discharging ink droplets in a state in which the printing sheet is not disposed vertically over (in the X direction) the detection position.

Regarding the light beam 404 of the present embodiment, a cross-sectional area in an XZ plane is about 2 mm×2 mm. In addition, a parallel light projection area of an ink droplet when the ink droplet passes through the light beam 404 is about 2-3 [$mm^2$]. A row of discharge ports and the light beam 404 are in a relationship in which they are parallel to each other, and a height-direction (Z-direction) clearance therebetween is set to 2 to 10 mm. When the clearance between the respective discharge ports and the light beam 404 is decreased, the passing of the ink droplet can be detected by the light beam 404 at a close position in relation to a propelled distance of the discharged ink droplet, and thus, the discharging state can be stably detected. However, a component of the amount of light for which a diffused light component emitted from the light emitting element 401 is reflected off of the discharge port surface 201*a* of the printhead 201 and then received by the light receiving element 402 is generated due to the row of discharge ports and the light beam 404 being close to each other. As a result, that component is added to the detection signal as a noise component in relation to the detection of the discharging state, and the detection accuracy may decrease. Therefore, the clearance between the light beam 404 of the droplet detection sensor 205 and the row of discharge ports of the printhead 201 is determined in consideration of these correlative relationships. In addition, in order to match conditions for detecting ink droplets by the droplet detection sensor 205 and the state of discharging ink droplets onto the printing sheet 203 at the time of image formation, the light beam 404 and the platen 212, which supports the printing sheet 203, are disposed at substantially the same position (height) in the vertical direction (Z direction).

Next, a configuration for determining the discharging state and the non-discharging of discharged ink droplets will be described. The configuration illustrated in FIG. 4A is a schematic view illustrating a result of detection by the droplet detection sensor 205 for when the discharging state detection target discharge port 216 (in the description of this drawing, N-th nozzle) of the printhead 201 is performing normal discharge. Ink droplets are discharged toward the droplet detection sensor 205 based on the discharge signal via the head control unit 310 and the head control circuit 305 in the CPU 301. The above-described clamping circuit is operated by a control signal that is synchronized with the discharge of ink droplets, and an outputted signal level is held at a predetermined clamping voltage value, just before the discharge of ink droplets is detected.

The CPU 301 releases the operation performed by the clamping circuit, just before the discharge of ink droplets is started and the ink droplets discharged toward the light beam 404 block light. Furthermore, it is determined that the ink droplets are in a normal discharging state when it is detected that the amount of light changed due to the discharged ink droplets passing through the light beam 404 of the droplet detection sensor 205 is smaller than a reference voltage value, which is determined according to an amount of change when ink droplets block the light beam 404. As a result, it is determined that the detection target nozzle (N-th nozzle) has performed normal discharge. Here, a result for which discharge from the N-th nozzle, which is the detection target, is performed a plurality of times in order to obtain a more reliable result for the result of detection of the discharging state by the droplet detection sensor 205 is illustrated.

FIG. 4B is a schematic diagram illustrating a detection result for when the discharging state detection target nozzle (here, N-th nozzle is also provisionally assumed) of the printhead 201, which has been described in FIG. 4A, is not performing normal discharge, that is, in a non-discharging state. Similarly to the diagram illustrated in FIG. 4A, ink droplets are discharged toward the droplet detection sensor 205 based on the discharge signal via the head control unit 310 and the head control circuit 305 in the CPU 301. However, here, the ink droplets are not discharged correctly, and thus, a state in which ink droplets are not discharged sufficiently is entered. As a result, the ink droplets do not block the light beam 404, and thus, a decrease in the amount of light generated when discharge was correctly performed in advance is not obtained. Thus, even when an instruction is given to discharge ink droplets after the detection signal exceeds the clamping voltage, the detection signal does not fall under the reference voltage. In such a case, the CPU 301 determines that the N-th nozzle, which is the detection target, does not perform normal discharge and thus is in a non-discharging state.

Figures 5A, 5B:
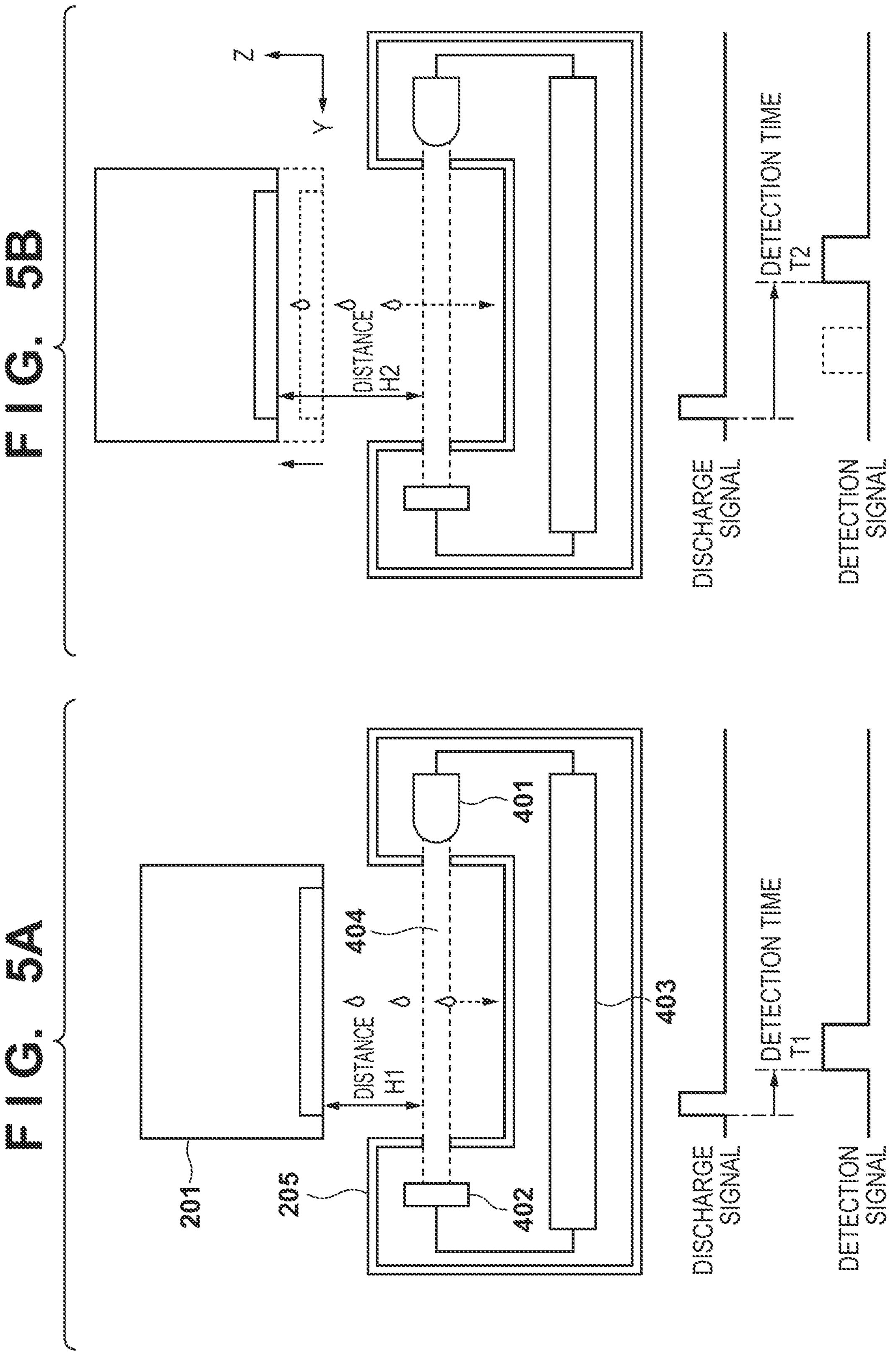
FIG. 5A is a diagram illustrating a change in detection time corresponding to a change in a height of a printhead.
FIG. 5B is a diagram illustrating a change in detection time corresponding to a change in the height of the printhead.

FIG. 5A is a diagram illustrating an example of an inner configuration of the droplet detection sensor 205 for detecting a discharge velocity of ink droplets discharged from the printhead 201. The CPU 301 drives the lift motor 211 to increase the distance between the printhead 201 and the droplet detection sensor 205 by a predetermined amount (first distance) and, in that state, discharges ink droplets and detects the discharged ink droplets.

A configuration for detecting discharged ink droplets and calculating a velocity thereof will be described in detail. In the configuration illustrated here, ink droplets are discharged toward the droplet detection sensor 205 from the printhead 201 based on the discharge signal via the head control unit 310 and the head control circuit 305 in the CPU 301. A timing at which the amount of light changes when the ink droplets pass through the light beam 404 entering from the droplet detection sensor 205 is outputted as the detection signal. At this time, a first detection time T1, from when the discharge signal is issued to when the detection signal is outputted, which corresponds to a distance H1 from the printhead 201 to the droplet detection sensor 205, is detected.

Next, FIG. 5B is a diagram illustrating an example of an inner configuration for driving the lift motor 211, further increasing the distance between the printhead 201 and the droplet detection sensor 205 (by a second distance) relative to FIG. 5A, and then detecting the discharge velocity of ink droplets. Similarly to FIG. 5A, a timing at which the amount of light changes when the ink droplets pass through the light beam 404 entering from the droplet detection sensor 205 is outputted as the detection signal. At this time, a second detection time T2, from when the discharge signal is issued to when the detection signal is outputted, which corresponds to a distance H2 from the printhead 201 to the droplet detection sensor 205, is detected.

Here, regarding FIGS. 5A and 5B, a first discharge velocity V1 of ink droplets is calculated based on a difference in distance between the first distance and the second distance and a difference between the first and second detection times.

$$V1=(H2-H1)/(T2-T1)$$

Figure 5D:
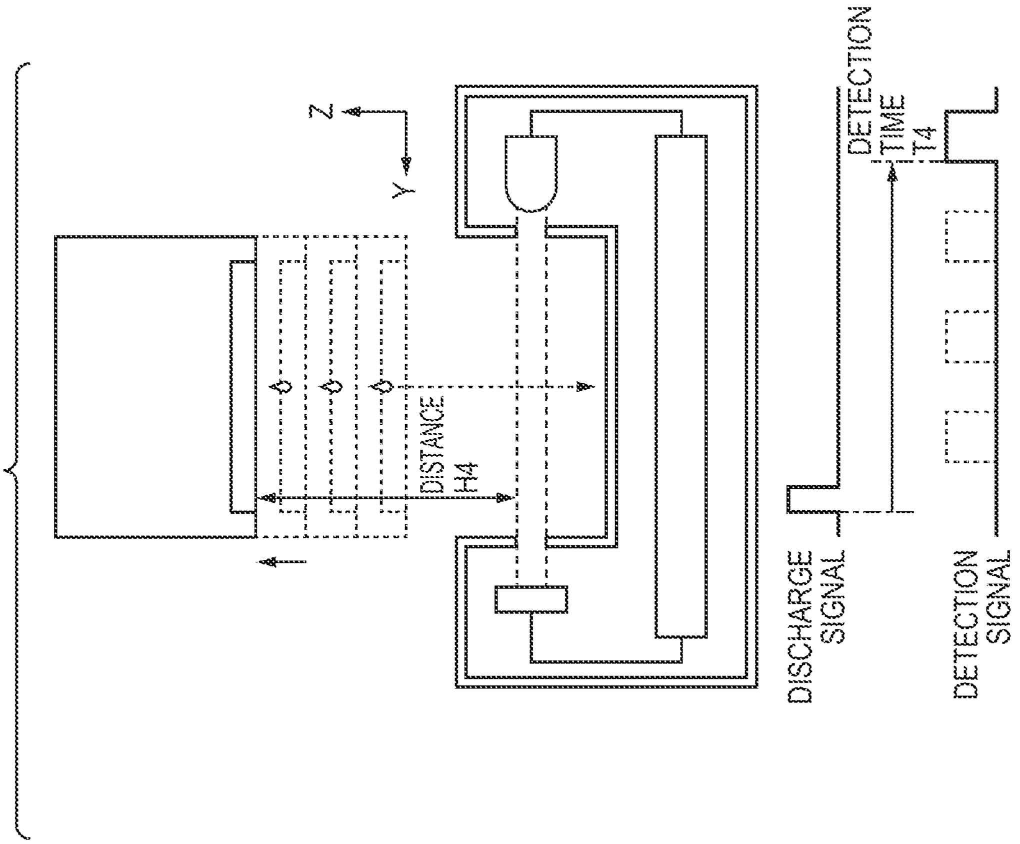
FIG. 5D is a diagram illustrating a change in detection time corresponding to a change in the height of the printhead.
Figure 5C:
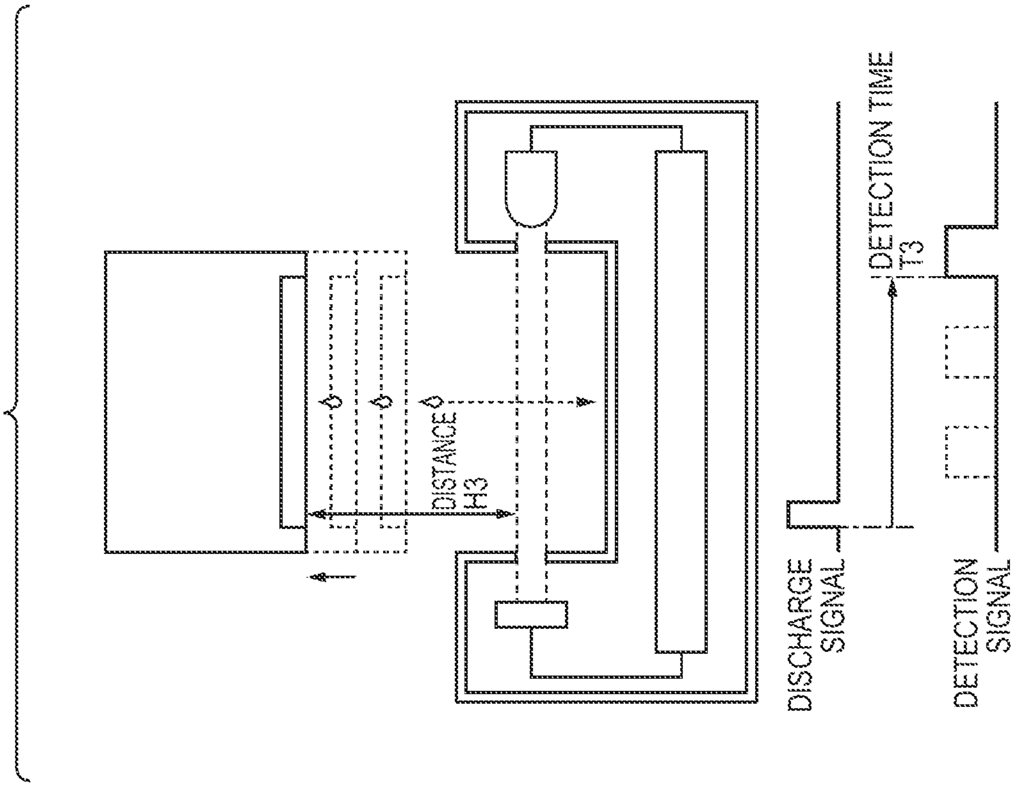
FIG. 5C is a diagram illustrating a change in detection time corresponding to a change in the height of the printhead.

Next, FIG. 5C is a diagram illustrating an example of an inner configuration for driving the lift motor 211, further increasing the distance between the printhead 201 and the droplet detection sensor 205 relative to FIGS. 5A and 5B, and then detecting the discharge velocity of ink droplets. Similarly to FIGS. 5A and 5B, a timing at which the amount of light changes when the ink droplets pass through the light beam 404 entering from the droplet detection sensor 205 is outputted as the detection signal. At this time, a third detection time T3, from when the discharge signal is issued to when the detection signal is outputted, which corresponds to a third distance H3 from the printhead 201 to the droplet detection sensor 205, is detected.

Here, similarly to the first and second distances, regarding FIGS. 5B and 5C, a second discharge velocity V2 of ink droplets is calculated based on a difference in distance between the second distance and the third distance and a difference between the second and third detection times.

$$V2=(H3-H2)/(T3-T2)$$

Next, FIG. 5D is a diagram illustrating an example of an inner configuration for driving the lift motor 211, further increasing the distance between the printhead 201 and the droplet detection sensor 205 relative to FIGS. 5A, 5B, and 5C, and then detecting the discharge velocity of ink droplets. Similarly to FIGS. 5A, 5B, and 5C, a timing at which the amount of light changes when the ink droplets pass through the light beam 404 outputted from the light emitting element 401 is outputted as the detection signal. At this time, a fourth detection time T4, from when the discharge signal is issued to when the detection signal is outputted, which corresponds to a fourth distance H4 from the printhead 201 to the droplet detection sensor 205, is detected.

Here, similarly to the first, second, and third distances, regarding FIGS. 5C and 5D, a third discharge velocity V3 of ink droplets is calculated based on a difference in distance between the third distance and the fourth distance and a difference between the third and fourth detection times. In other words:

$$V3=(H4-H3)/(T4-T3)$$

As described above, the discharge velocity of ink droplets is determined based on the change in the detection time of ink droplets when the distance between the printhead 201 and the droplet detection sensor 205 is changed.

The distance between the printhead 201 and the droplet detection sensor 205 may be further increased by the lift motor 211 according to the configuration described above. With this configuration, more spaced distances and their respective detection times of ink droplets can be measured, and thus, the discharge velocity of ink droplets can be calculated more accurately. Meanwhile, it is also possible to reduce the number of distances by which the printhead 201 and the droplet detection sensor 205 are separated by the lift motor 211 according to the configuration described above and the number of differences in distance so as to shorten the time required to detect the discharge velocity of ink droplets.

As described above, it is possible to provide a lifting unit for changing the distance from the printhead 201 to the printing sheet in a plurality of stages and a unit for accurately detecting ink discharge by detecting a change in ink discharge velocity in each stage.

The discharging state may change due to the nozzle 216 discharging droplets. Meanwhile, the change due to several instances of droplet discharge is small. Therefore, as an estimate, the discharging state need only be monitored once every several pages. In one example, the head control unit 310 may count the number of instances of discharge of each nozzle 216 of the printhead 201 as a dot count and, for the nozzle 216 for which the dot count exceeds a predetermined threshold, determine the discharging state before performing printing on the printing sheet. The determination of the discharging state may be performed after receiving an instruction for a printing process and before performing printing on the printing sheet. In another example, when performing the printing process that spans a plurality of pages, the effect on the process for performing printing on the printing medium can be reduced by performing the determination during inter-page conveyance of the printing medium or scanning of the printhead 201. The processing timing is not limited to this.

Figure 6:
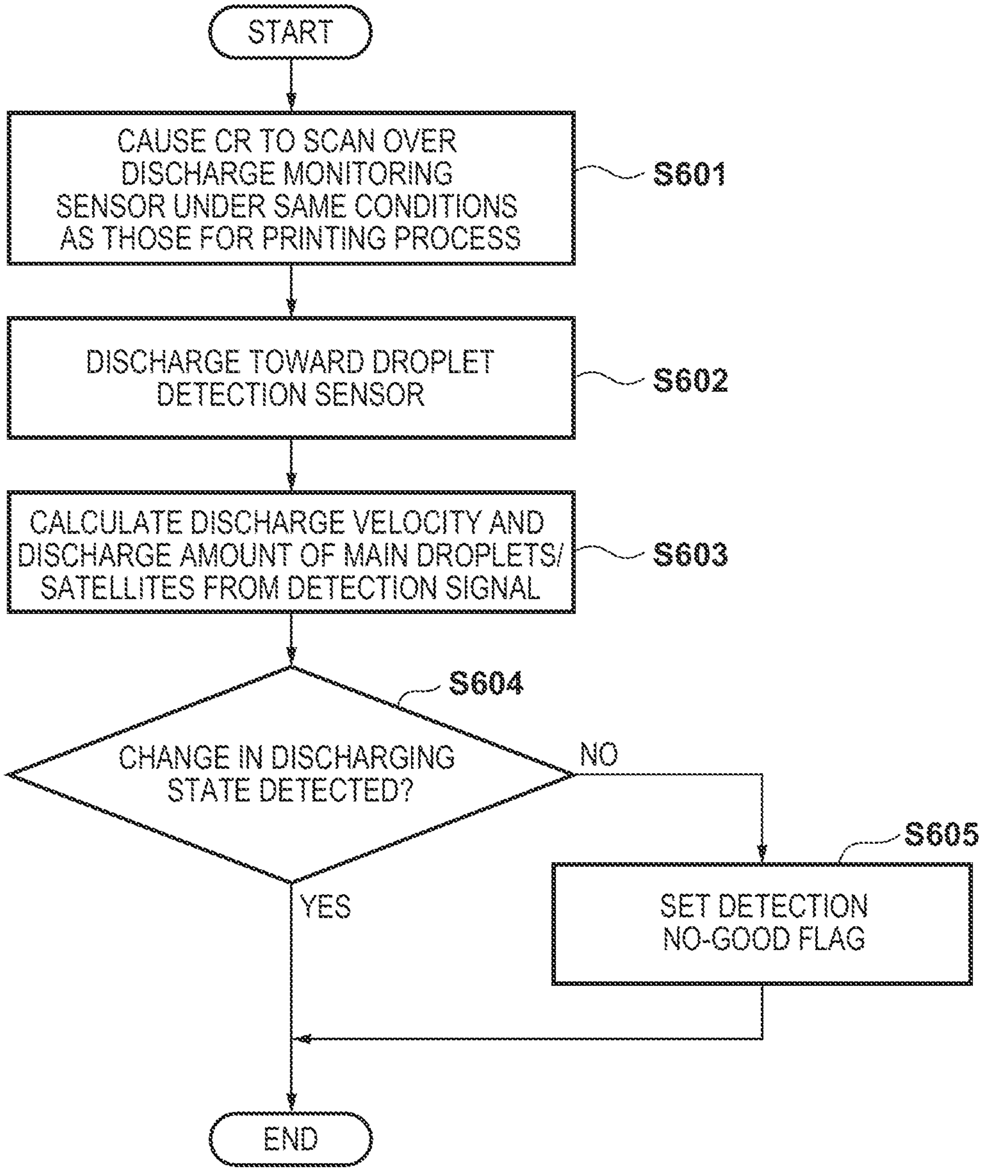
FIG. 6 is a flowchart for explaining an example of a process to be executed by the printing apparatus according to the present embodiment.

FIG. 6 illustrates an example of a process to be executed by the printing apparatus 100 according to the present embodiment. The process illustrated in FIG. 6 is realized by the CPU 301 executing a program stored in the memory 303.

In step S601 (referred to as S601; similar applies to subsequent processing steps), the CPU 301 causes the CR 202 to perform scanning under the same conditions as those for the printing process and causes the CR 202 to pass over the droplet detection sensor 205; the CPU 301 performs discharge onto the droplet detection sensor 205 such that the ink droplets pass through the light beam 404 (S602).

Here, being under the same conditions as those for the printing process includes using the same parameters as those for driving in the printing process for driving the CR 202 and the printhead 201. The driving of the CR 202 includes the height, a driving velocity, and control of the CR 202. For example, regarding the carriage driving velocity, there are an acceleration region in which the carriage moves while accelerating, a constant velocity region in which the carriage moves at a constant velocity, and a deceleration region in which the carriage moves while decelerating; however, most of the printing is performed in the constant velocity region. Therefore, discharge monitoring is also performed in the constant velocity region. The deceleration region is a region in which an acceleration of the CR 202 is less than a negative predetermined value a1, the acceleration region is a region in which the acceleration of the CR 202 is greater than or equal to a positive predetermined value a2, and the constant velocity region is a region in which the acceleration of the CR 202 is greater than or equal to a1 and less than a2. That is, in the constant velocity region, the velocity of the CR 202 need only be within a predetermined range. The driving of the printhead also includes using the same parameters as those for the printing process for block driving and discharge pulse width parameters.

The CR 202 is driven under the same conditions as those for the printing process in order to monitor the change in a landing state of discharged droplets formed on the printing sheet. The conditions here include the distance between the CR 202 and the printing sheet (the height of the carriage) and a scanning velocity of the CR 202.

Figure 7:
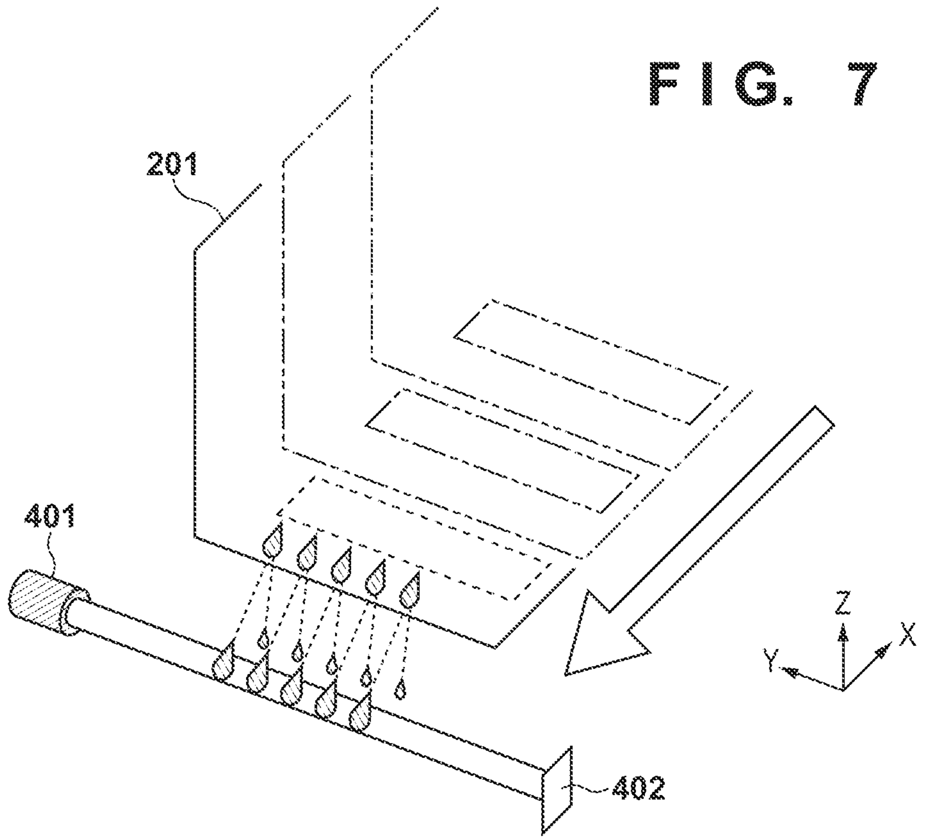
FIG. 7 is a conceptual diagram in which discharge detection is performed while driving a CR.

FIG. 7 illustrates a conceptual diagram in which discharge detection is performed while driving the CR. The ink droplets discharged from the printhead 201 are discharged, separated into main droplets and small droplets other than the main droplets (hereinafter, referred to as satellites) depending on the discharge conditions. At the time of discharge, the main droplets and the satellites are discharged from the same discharge port 216; however, a landing position on the printing sheet may change due to a difference in discharge velocity. In order to detect the change in landing position on the printing sheet and landed dot shape, discharge monitoring whose conditions are the same as those for the printing process is performed. In the present embodiment, description will be given assuming that the same conditions as those for the printing process is used; however, the conditions need not always coincide in order to detect a change in the discharging state of ink droplets, and driving conditions that are different from those of the actual printing process may be used.

Figure 8A:
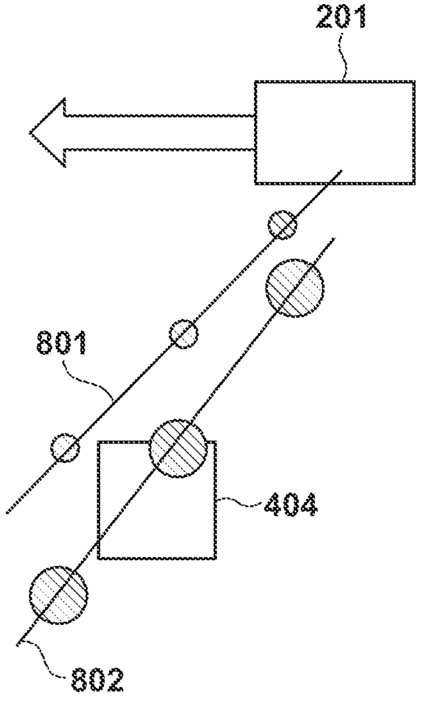
FIG. 8A is a diagram illustrating droplet detection in a CR driving state.
Figure 8B:
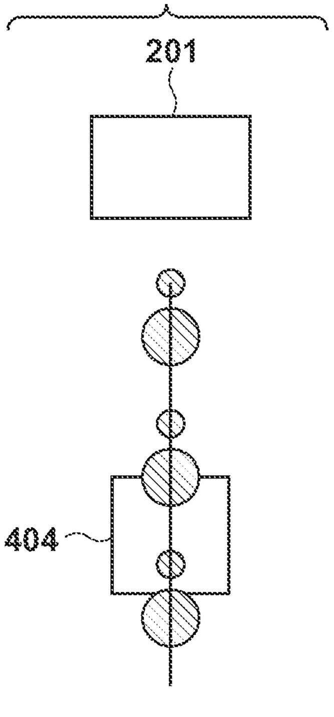
FIG. 8B is a diagram illustrating droplet detection in a CR non-driving state.

As a supplement for explaining detection during driving of the CR, a difference between the discharge in a CR driving state and the discharge in a CR non-driving state will be described, using FIGS. 8A and 8B. FIG. 8A illustrates a discharge unit and a detection unit for performing discharge and detection, respectively, while the CR 202 is being driven. FIG. 8B illustrates the discharge unit and the detection unit for performing discharge and detection, respectively, while the CR 202 is stopped. The droplets discharged from the nozzle 216 vary in droplet size and discharge velocity between the main droplets and the satellites. In one example, the discharge velocity of satellites is smaller than the discharge velocity of main droplets. That is, the main droplets are greater in the amount of movement in the vertical direction (Z direction) than the satellites in the same period. Meanwhile, the amount of movement of the CR 202 in the movement direction (−X direction) is the same between the main droplets and the satellites. Therefore, when performing discharge detection while the CR 202 is being driven, the main droplets are propelled on a trajectory 802 of a different inclination in the XZ plane from a trajectory 801 on which the satellite is propelled. The head control unit 310 controls the discharge timing such that one of the trajectories 801 and 802 passes the light beam 404, that is, a droplet detection area, such that the CPU 301 can determine the detection timing, separating the main droplets and the satellites.

Meanwhile, as illustrated in FIG. 8B, when discharging is performed in a non-driving state of the CR 202, the trajectory on which the satellites are propelled and the trajectory on which the main droplets are propelled will be the same, and thus, the main droplets and the satellites cannot be detected separately.

By thus performing discharge and detection while the CR 202 is being driven, it is possible to detect a change in the discharge size of main droplets, a change in the discharge velocity, a change in the discharge size of satellites, and the discharge velocity. The example of FIG. 8A is illustrated such that the trajectory 802 passes through the irradiation area of the light beam 404 in order to detect the main droplets; however, a method in which the discharge timing is shifted to detect only the satellites may be performed.

The main droplets and the satellites may pass through the detection unit at the same time and be separated by timings at which they are detected by the detection unit. In such a case, discharge may be performed in the non-driving state of the CR 202 as illustrated in FIG. 8B.

In S603 of FIG. 6, the CPU 301 calculates the discharge velocity and the droplet size of main droplets and the discharge velocity and the droplet size of satellites from the detected waveforms of the light receiving element 402.

Figure 9A:
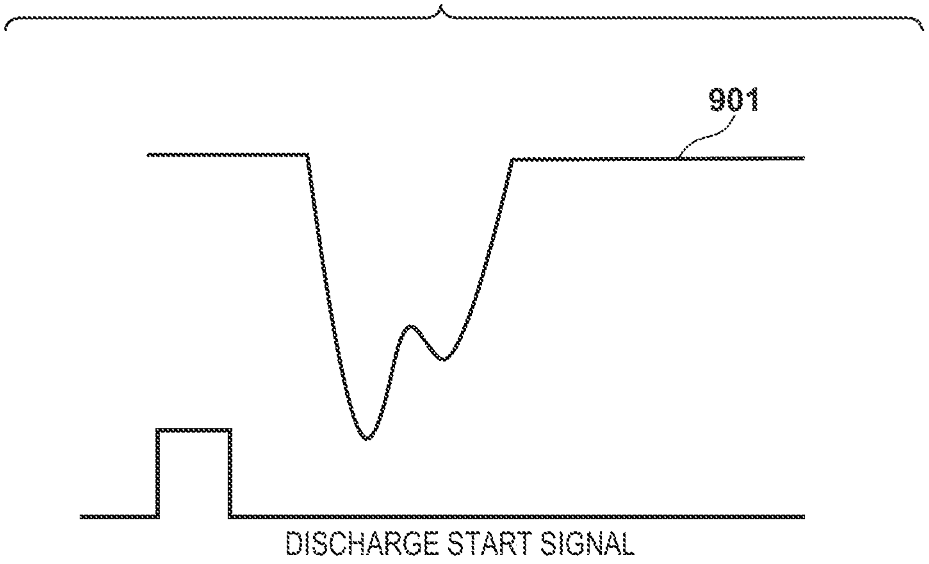
FIG. 9A is a schematic diagram for estimation of a discharge velocity and a discharge amount based on an amount of received light.
Figure 9B:
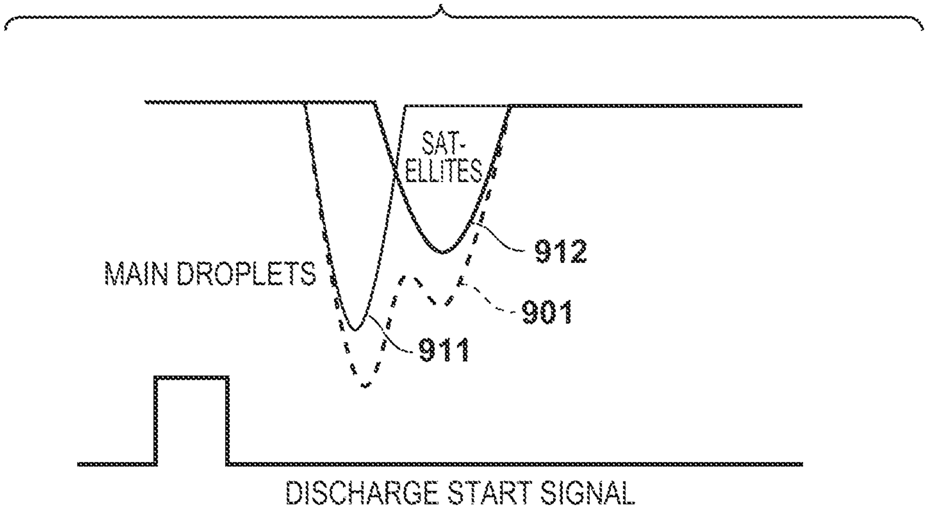
FIG. 9B is a schematic diagram for estimation of the discharge velocity and the discharge amount based on the amount of received light.

As described above with reference to FIG. 4A, when droplets pass through the light beam 404, the amount of light received by the light receiving element 402 changes, and thus, a signal outputted by the light receiving element 402 changes according to the amount of received light. FIGS. 9A and 9B illustrate schematic diagrams for calculating the discharge velocity and a discharge amount according to the present embodiment. FIG. 9A illustrates a detection signal 901, which is outputted according to the amount of received light detected by the light receiving element 402. The signal that changes when main droplets and satellites pass through the light beam 404 affects a distribution of the droplets passing through the light beam 404. The change in discharge velocity has a correlative relationship with the number of instances of discharge for printing, for each nozzle 216. Therefore, when using droplets discharged from the plurality of nozzles 216 for detection, the unevenness of a distribution of discharge velocities will be reduced by selecting the nozzles 216 that have similar number of instances of discharge.

In the example illustrated in FIG. 9B, function approximation is performed assuming that the discharge velocities of main droplets and the discharge velocities of satellites follow a normal distribution. Since main droplets always have a discharge velocity greater than or equal to that of satellites, a first waveform on the time axis is assumed as a waveform of main droplets and the other is assumed as a waveform of satellites between two normal distribution results. In one example, the CPU 301 may detect minimum values in a predetermined time period from when a discharge start signal is transmitted and determine that a first minimum value on the time axis corresponds to the waveform of main droplets and a second minimum value on the time axis corresponds to the waveform of satellites. In another example, detected amounts that are in a predetermined range on the time axis may be determined to be a waveform corresponding to main droplets. This is because the main droplets are droplets that are greater than or equal to a predetermined size and thus are detected within a predetermined time.

By the above-described methods, the CPU 301 can separate the waveform into a normal distribution 911 in which the detected amount of main droplets is approximated and a normal distribution 912 in which the detected amount of satellites is approximated based on the detection signal 901. However, function approximation need not always be performed using a normal distribution, and a polynomial may be used. In such a case, results of having performed function approximation, such as the normal distributions 911 and 912, are referred to as the approximation function 911 of main droplets and the approximation function 912 of satellites, respectively.

A peak fitting method is known as a method of separating the detection signal. This is a method in which a peak value or a full width at half maximum is given to a Gaussian function or a Lorentz function, and calculation is repeated until a synthetic spectrum of a waveform calculated by the respective function and a real spectrum coincide. For example, when the detection signal of main droplets alone or satellites alone can be approximated by the Gaussian function, the waveform can be separated as illustrated in FIG. 9B by performing peak fitting using the Gaussian function. After separating the waveform, the discharge velocity and discharge amount can be calculated from a difference in time from the discharge start signal until the peak is reached and the peak value, for the detection signal of main droplets and the detection signal of satellites, respectively.

The approximate function of the detection signal is not limited to the Gaussian function and may be the Lorentz function, a polynomial function, or the like. The method of separating by approximating the detection signal is not limited to the peak fitting method and may be a nonlinear least squares method or the like.

Figure 9C:
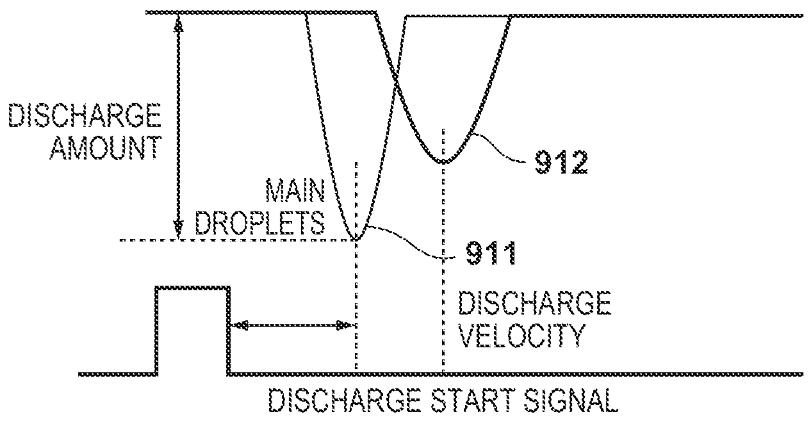
FIG. 9C is a schematic diagram for estimation of the discharge velocity and the discharge amount based on the amount of received light.
Figure 9D:
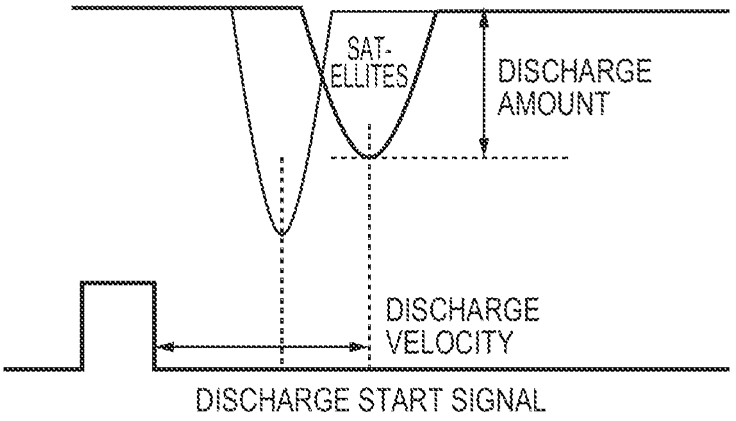
FIG. 9D is a schematic diagram for estimation of the discharge velocity and the discharge amount based on the amount of received light.

FIG. 9C is a conceptual diagram for calculating the discharge velocity and the discharge amount from the main droplets separated from the satellites. The CPU 301 calculates a time from the start of discharge of ink droplets until detection based on the approximate functions 911 and 912 described with reference to FIG. 9B. Since the distance between the CR 202 and the droplet detection sensor 205 is known, the discharge velocity can be calculated. In discharge monitoring, a difference from a last-calculated time from the start of discharge of ink droplets until detection is detected. Thus, if the distance between the CR 202 and the droplet detection sensor 205 is the same as that of the last detection, the CPU 301 need not accurately recognize an absolute value of the distance. For example, if an initial discharge velocity is 18 m/s, the detection accuracy of 18 m/s need not be high, and it need only be that a change of 0.5 m/s can be detected as an amount of change after use. The CPU 301 may determine the discharge amount from an amount of change in the detection signal. The discharge amount can be determined based on a predefined correspondence relationship between the amount of change in the detection signal of the light receiving element 402 and the discharge amount. FIG. 9D is a conceptual diagram for calculating the discharge velocity and the discharge amount from the satellites separated from the main droplets. The CPU 301 can determine the discharge velocity and the discharge amount of the satellites, similarly to those of the main droplets. Here, when the discharge velocity from the nozzle 216 changes, the landing position of droplets on the printing sheet shifts. In such a case, for example, when printing one vertical line, a printing defect, such as a thick line, a single line turning into two lines, or a position of the line being shifted, may occur. Similarly, when the size of droplets changes, the density of dots formed on the printing sheet changes. For example, when forming an image by overlaying magenta and cyan, a change in a droplet size of one of the nozzles may change a density balance of the colors and thus cause a printing defect. The discharge velocity and the discharge amount are calculated by the CPU 301 based on a detection value of the droplet detection sensor 205.

In S604, it is determined whether the discharge amount and the discharge velocity of the droplets are within a predetermined range. For example, in S604, it is determined whether the discharge amount of the droplet is greater than or equal to a first threshold associated with the discharge amount. It is also determined whether the discharge velocity is greater than or equal to a second threshold associated with the discharge velocity. If the discharge amount and the discharge velocity are greater than or equal to the first threshold and the second threshold, respectively, (Yes in S604), the CPU 301 determines that there is no change in the discharging state and ends the process illustrated in FIG. 6. Meanwhile, if it is determined that the discharge amount of droplets is less than the first threshold or the discharge velocity is less than the second threshold (No in S604), the CPU 301 determines that a change in the discharging state has occurred and advances the process to S605. The comparison with the threshold may be performed for only one of the discharge amount and the discharge velocity.

In S604, it may be determined whether an amount of change in discharge amount and an amount of change in discharge velocity of droplets when compared with a past detection result are less than or equal to a third threshold associated with the change amount of the discharge amount and a fourth threshold associated with the change amount of the discharge velocity, respectively. In this case, the past detection result is stored in the memory 303. If the amount of change in discharge amount is less than or equal to the third threshold and the amount of change in discharge velocity is less than or equal to the fourth threshold (Yes in S604), the CPU 301 determines that there is no change in the discharging state and ends the process illustrated in FIG. 6. The CPU 301 can determine a change by comparing the current discharging state with the initial or past discharging state. Meanwhile, if the amount of change in the discharge amount and the discharge velocity is larger than the third threshold or the fourth threshold (No in S604) when compared with the past detection result, the CPU 301 determines that the change in the discharging state has occurred and advances the process to S605.

Upon comparing the discharge velocity and the discharge amount of main droplets or satellites and the above-described first and second thresholds, respectively, if either one falls below their threshold, the printing process may be affected. In addition, if the amount of change in the discharge velocity and the amount of change in the discharge amount of main droplets or satellites are greater than the third threshold and the fourth threshold, respectively, the printing process may be affected. Thus, in S605, the CPU 301 turns on a detection no-good flag stored in the memory 303 and ends the process. The detection no-good flag is a flag that indicates that the discharging state of the printhead 201 being in a normal state has not been detected.

In S605, a process for recovering the printhead 201 may be automatically performed. The recovery process includes performing consecutive discharge into a cap (not illustrated) a plurality of times consecutively, such as 1000 or more times—for example, 10000 times. The recovery process may include suctioning of the nozzle 216 by the cap (not illustrated) or may include execution of a cleaning process, such as wiping of the nozzle 216, and a contaminant removal process by electric potential. By performing detection of the discharging state in the same manner after performing these recovery processes, it is possible to determine whether the discharging state has been recovered by the recovery processes.

In the present embodiment, the first to fourth thresholds used as the reference values of the discharging state have been described, assuming that they are values registered in advance at the time of product manufacturing. However, in one example, the first to fourth thresholds may be updated based on the detection result of the droplet detection sensor 205. For example, between the discharge velocity and the discharge amount detected in S603, the discharge amount or the discharge velocity determined to be greater than or equal to one of the thresholds may be stored as a new one of the first to fourth thresholds in the memory 303.

Regarding the reference values (first to fourth thresholds) of the discharge velocity and the discharge amount stored in the memory 303, the discharge velocity and the discharge amount at the time of printer adjustment, specifically, after registration adjustment (also referred to as landing position adjustment) or density adjustment (referred to as color calibration) may be used. The discharge velocity and the discharge amount at the time of performing adjustment is detected and stored in the memory 303. Thereafter, the discharge velocity and the discharge amount are compared with the aforementioned starting point, at a timing at which they are detected in discharge monitoring. The starting point is updated at a timing at which registration adjustment or density adjustment is performed.

In S605, the CPU 301 may notify a user of the change in the discharging state. In such a case, the CPU 301 may transmit to the user or an administrator, via a network, a message instructing adjustment of discharge, or the message may be displayed on the display panel 103 of the printing apparatus 100.

In S605, the CPU 301 may perform a registration adjustment process (registration adjustment) based on the detection result. For example, when there is no change in the discharge amount and there is a change in the discharge velocity, the landing position on the printing sheet simply changes, and thus, the CPU 301 may be able to cope with the change in the discharging state by changing the discharge timing. Therefore, registration for determining the discharge timing for discharging droplets at the landing position is adjusted. Further, density of the printing process of the printing apparatus 100 may be adjusted. Further, a process for changing the distance between the printhead 201 and the printing medium in the printing process of the printing apparatus 100 may be executed. That is, in S605, a different process may be performed depending on the changed discharging state.

A method of performing a discharge landing position adjustment process is conceivable as a method of performing automatic adjustment when a change in the discharging state is detected. This can be realized by performing printing on a printing medium and detecting a printed pattern. Further, as another method, a method of calculating the amount of change in discharge velocity using the discharge timing is also possible. It is possible to calculate an amount of shift in the landing position due to the change in the discharge velocity according to a distance between the printhead and paper and an operation velocity and the discharge velocity of the carriage. By using this method, waste paper produced by printing can be reduced.

An operation of scanning the CR 202 under the same conditions as in the image formation described in S601 of FIG. 6 and passing over a discharge monitoring sensor will be additionally described.

The discharge monitoring sensor is different from the droplet detection sensor 205 for detecting non-discharge in the configuration of the optical system and the purpose of the function to be realized; however, it is preferable that the droplet detection sensor 205 described in FIG. 2 is used for both in terms of the number of hardware components. Therefore, as one of the embodiments, detection is performed by the droplet detection sensor 205 disposed outside a printing region in which printing is performed on the printing medium.

Meanwhile, the present discharge monitoring may be performed during a printing operation. In such a case, the movement of the CR 202 to the droplet detection sensor 205 located outside of the printing region may result in a reduced throughput of the printing process. Therefore, a preliminary discharge port disposed nearest to the printing region may also serve as the discharge monitoring sensor. By disposing the discharge monitoring sensor in a region through which the CR 202 passes even during printing, discharge monitoring can be performed without lowering the printing throughput.

In a case where the droplets are divided into main droplets and satellites when droplets pass through the discharge monitoring sensor, a state will be such that, after a small amount of time from when only the main droplets block the light beam, the main droplets and the satellites block the light beam. As a result, the detection signal of the discharge monitoring sensor will have a waveform with two peak values (local minimum values) as illustrated in FIG. 9A. This can be treated as a combination of the detection signal of main droplets and the detection signal of satellites. In order to calculate the discharge velocity and the droplet size of main droplets and the discharge velocity and the droplet size of satellites, it is necessary to separate the detection signal into the detection signal of main droplets and the detection signal of satellites.

Supplemental explanation will be added for the determination of the change in the discharging state illustrated in S604 of FIG. 6. The purpose of discharge monitoring is to detect a change from a discharging state that is determined to be correct. Initial installation or a state at the time of shipment of the printing apparatus 100 is conceivable as a starting point at which the discharging state is determined to be correct. A state immediately after the printhead 201 is replaced or a state after discharge landing position adjustment (registration adjustment) is conceivable as another starting point. In each state, the discharging state is detected and a value thereof is stored as a predefined discharging state. It is determined that the discharging state is defective when an amount of change from the predefined discharging state becomes a certain value or more.

As described above, according to the present embodiment, it is possible to accurately determine the discharging state of droplets of the printing apparatus, and thus it is possible to monitor the discharging state with high accuracy. This makes it possible to prevent a printing defect from occurring due to aging or an unintended change in discharge.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2022-203522, filed Dec. 20, 2022, and 2022-203523, filed Dec. 20, 2022, which are hereby incorporated by reference herein in their entirety.

What is claimed is:

1. A printing apparatus comprising:
- a carriage on which a printhead is mounted, wherein the printhead is configured to discharge droplets onto a printing medium from a nozzle of the printhead and wherein the carriage is configured to move relative to the printing medium in a horizontal direction which is perpendicular to a conveyance direction of the printing medium;
- a detection unit configured to detect droplets discharged from the nozzle;
- a discharge control unit configured to control discharge of droplets from the nozzle; and
- a control unit configured to control the movement of the carriage and the discharge control unit and determine a discharging state of the nozzle based on a result of detection of the detection unit,
- wherein the control unit determines the discharging state of the nozzle:
  - by controlling the discharge control unit to cause droplets to be discharged from the nozzle while causing the carriage to move in the horizontal direction under conditions that are the same as those to be used for a printing process of printing on the printing medium with the printhead; and
  - by deriving, from a detection signal obtained by the detection unit, information regarding a discharge velocity and a droplet size of droplets included in the droplets discharged from the nozzle while the carriage is moving in the horizontal direction, and
- wherein the control unit derives the discharging state of the nozzle by comparing information regarding a discharge velocity and a droplet size at a first timing and information regarding a discharge velocity and a droplet size at a second timing.

2. The printing apparatus according to claim 1,
- wherein the detection unit comprises:
  - a light emitting unit configured to irradiate light; and
  - a light receiving unit configured to receive the light irradiated from the light emitting unit and output a signal according to an amount of received light, and
- wherein the discharge control unit performs control such that droplets discharged from the printhead block the light from the light emitting unit to the light receiving unit.

3. The printing apparatus according to claim 2,
- wherein the control unit determines a detection timing of the droplets based on a change in the signal, outputted from the light receiving unit, that changes when the droplets block the light, and
- the control unit derives the discharge velocity of the droplets based on a transmission timing of an instruction signal instructing the printhead to perform discharge in the discharge control unit.

4. The printing apparatus according to claim 3, further comprising:
- an adjustment unit configured to adjust a distance from the nozzle to the light in a discharge direction of the nozzle,
- wherein the control unit derives the discharge velocity of the droplets based on a first time, from the transmission timing until the detection timing in a case where the distance from the nozzle to the light is a first distance, and a second time, from the transmission timing until the detection timing in a case where the distance from the nozzle to the light is a second distance.

5. The printing apparatus according to claim 3, further comprising:
- a storage unit that stores a threshold associated with the discharge velocity of droplets, wherein
- the control unit determines that a discharging state has changed in a case where the discharge velocity of the droplets derived in the control unit falls below the threshold.

6. The printing apparatus according to claim 5, further comprising:
- a setting unit configured to set the threshold in the storage unit based on the detection result of the detection unit.

7. The printing apparatus according to claim 2, wherein the control unit derives a discharge amount of the droplets based on an amount of change in the signal outputted from the light receiving unit due to the droplets blocking the light.

8. The printing apparatus according to claim 7, further comprising:

a storage unit that stores a threshold associated with a discharge amount of droplets, wherein the control unit determines that a discharging state has changed in a case where the discharge amount of the droplets determined in the control unit falls below the threshold.

9. The printing apparatus according to claim 8, further comprising:

a setting unit configured to set the threshold in the storage unit based on the detection result of the detection unit.

10. The printing apparatus according to claim 1, wherein the control unit determines the discharging state of the nozzle based on a result of detection of the droplets discharged from the nozzle while the carriage is moving at a constant velocity.

11. The printing apparatus according to claim 1, wherein the discharge control unit selects a nozzle to discharge droplets, from a plurality of nozzles included in the printhead, based on a dot count of a printing process.

12. The printing apparatus according to claim 1, further comprising:

a notification unit configured to notify a user that the control unit has determined that the discharging state has changed.

13. The printing apparatus according to claim 1, wherein the droplets from the nozzle include a plurality of droplets including main droplets and satellites, and the main droplets discharged from the nozzle while the carriage is moving are discharged on a trajectory different from that of the satellites.

14. The printing apparatus according to claim 1, further comprising:

an execution unit configured to, in a case where the control unit determines that the discharging state has changed, execute a registration adjustment process.

15. The printing apparatus according to claim 1, wherein the control unit determines the discharging state of the nozzle:

by deriving, from the detection signal obtained by the detection unit, a discharge velocity and a droplet size of main droplets and satellites included in the droplets discharged from the nozzle while the carriage is moving in the horizontal direction, wherein the satellites are droplets that generate when the droplets discharged from a nozzle separate into the main droplets and the satellites and are smaller than the main droplets, and by comparing a threshold stored in a storage unit and the derived discharge velocity and the droplet size of the main droplets and the satellites, respectively, and the control unit is configured to derive the discharge velocity and the droplet size of the main droplets and the satellites, respectively, by separating a detection signal obtained by the detection unit into approximation functions of a detection signal of the main droplets and of the satellites, respectively.

16. The printing apparatus according to claim 1, wherein the control unit derives the information regarding the droplet size based on a peak value obtained from the detection signal.

17. The printing apparatus according to claim 1, wherein when determining the discharging state, the control unit controls a plurality of nozzles of the printhead to discharge droplets simultaneously.

18. The printing apparatus according to claim 1, wherein the first timing corresponds to after an initial installation or shipment of the printing apparatus.

19. The printing apparatus according to claim 1, wherein the first timing corresponds to after the print head has been replaced.

20. The printing apparatus according to claim 1, wherein the first timing corresponds to after execution of a registration adjustment for the printing apparatus.

21. A printing apparatus comprising:

a carriage on which a printhead is mounted, wherein the printhead is configured to discharge droplets onto a printing medium from a nozzle of the printhead and wherein the carriage is configured to move relative to the printing medium in a horizontal direction which is perpendicular to a conveyance direction of the printing medium;

a detection unit configured to detect droplets discharged from the nozzle;

a discharge control unit configured to control discharge of droplets from the nozzle; and a control unit configured to control the movement of the carriage and the discharge control unit and determine a discharging state of the nozzle based on a result of detection of the detection unit, wherein the control unit determines the discharging state of the nozzle:

by controlling the discharge control unit to cause droplets to be discharged from the nozzle while causing the carriage to move in the horizontal direction under conditions that are the same as those to be used for a printing process of printing on the printing medium with the printhead; and by deriving, from a detection signal obtained by the detection unit, information regarding a discharge velocity and a droplet size of droplets included in the droplets discharged from the nozzle while the carriage is moving in the horizontal direction, and the control unit derives the information regarding the discharge velocity based on a difference in time between a discharge start signal and a peak of the detection signal.

22. A printing apparatus comprising:

a carriage on which a printhead is mounted, wherein the printhead is configured to discharge droplets onto a printing medium from a nozzle of the printhead while moving the carriage relative to the printing medium;

a detection unit configured to detect droplets discharged from the nozzle;

a discharge control unit configured to control discharge of droplets from the nozzle; and a control unit configured to determine a discharging state of the nozzle based on a result of detection of the detection unit, wherein the discharge control unit causes droplets to be discharged from the nozzle while the carriage is moving, wherein the control unit determines the discharging state of the nozzle by deriving, from a detection signal obtained by the detection unit, a discharge velocity and a droplet size of main droplets and satellites included in the droplets discharged from the nozzle while the carriage is moving in the horizontal direction, wherein main droplets and satellites are droplets that generate when droplets discharged from a nozzle separate into main droplets and satellites which are other droplets smaller than the main droplets, the control unit is configured to derive the discharge velocity and the droplet size of the main droplets and the satellites, respectively, by separating a detection signal obtained by the detection unit into approximation functions of a detection signal of main droplets and of satellites, respectively, and the control unit determines that a change in the discharging state has occurred when the discharge velocity of the main droplets or the discharge velocity of the satellites is less than a predetermined threshold.

* * * * *